(12) United States Patent
Sutton et al.

(10) Patent No.: US 8,820,801 B2
(45) Date of Patent: *Sep. 2, 2014

(54) MULTI-WALL CORRUGATED PIPE COUPLINGS AND METHODS

(75) Inventors: Gerald S. Sutton, Hamilton, OH (US); William V. Shaffer, West Chester, OH (US); James B. Goddard, Powell, OH (US); John M. Kurdziel, Fort Wayne, IN (US); David J. Kelley, Hamilton, OH (US); Jeffrey J. Biesenberger, Columbus, OH (US)

(73) Assignee: Advanced Drainage System, Inc., Hilliard, OH (US)

( * ) Notice: Subject to any disclaimer, the term of this patent is extended or adjusted under 35 U.S.C. 154(b) by 21 days.

This patent is subject to a terminal disclaimer.

(21) Appl. No.: 12/272,075

(22) Filed: Nov. 17, 2008

(65) Prior Publication Data

US 2009/0127853 A1    May 21, 2009

Related U.S. Application Data

(63) Continuation-in-part of application No. 11/941,605, filed on Nov. 16, 2007.

(51) Int. Cl.
*F16L 17/00* (2006.01)
(52) U.S. Cl.
USPC ........................................... 285/374; 285/903
(58) Field of Classification Search
USPC ...................... 285/374, 903; 138/173, 121
See application file for complete search history.

(56) References Cited

U.S. PATENT DOCUMENTS

| | | | |
|---|---|---|---|
| 2,700,631 A | 1/1955 | Sussenbach et al. |
| 2,753,596 A | 7/1956 | Bailey |
| 2,877,150 A | 3/1959 | Wilson |
| 2,888,954 A | 6/1959 | Gates |
| 2,931,069 A | 4/1960 | McCormick |
| 3,081,102 A | 3/1963 | Murray et al. |
| 3,379,805 A | 4/1968 | Roberts |

(Continued)

FOREIGN PATENT DOCUMENTS

| | | |
|---|---|---|
| DE | 297 06 045 | 6/1997 |
| EP | 0 041 252 | 12/1981 |

(Continued)

OTHER PUBLICATIONS

*Modern Plastics Worldwide*, Apr. 2008 edition, p. 35, "Device offers alternative for constant flow filtration."

*Primary Examiner* — Aaron Dunwoody
(74) *Attorney, Agent, or Firm* — Finnegan Henderson Farabow Garrett & Dunner, L.L.P.

(57) ABSTRACT

A coupling for multi-wall, corrugated pipe, the pipe including a corrugated wall having a plurality of primary corrugations, is disclosed. The coupling includes a first pipe section having disposed at one end a bell portion, the bell portion having a bell portion of corrugated wall and an outer wall; a second pipe section having disposed at one end a spigot portion, the spigot portion having a spigot portion of corrugated wall between an inner wall and an outer wall; and a gasket disposed in a groove extending around a circumference of the spigot portion and engaged between the bell portion of corrugated wall and the spigot portion of corrugated wall. A multi-wall, corrugated pipe section, and method for assembling a plurality of multi-wall, corrugated pipe sections, are also disclosed.

19 Claims, 6 Drawing Sheets

(56) References Cited

U.S. PATENT DOCUMENTS

| | | | |
|---|---|---|---|
| 3,490,496 A | 1/1970 | Stearns | |
| 3,538,209 A | 11/1970 | Hegler | |
| 3,573,871 A | 4/1971 | Warner | |
| 3,605,232 A | 9/1971 | Hines | |
| 3,649,730 A | 3/1972 | Lachenmayer et al. | |
| 3,677,676 A | 7/1972 | Hegler | |
| 3,725,565 A | 4/1973 | Schmidt | |
| 3,802,908 A | 4/1974 | Emmons | |
| 3,819,292 A | 6/1974 | Wentworth | |
| 3,824,886 A | 7/1974 | Hegler | |
| 3,837,364 A | 9/1974 | Jenner | |
| 3,869,235 A | 3/1975 | Moore | |
| 3,944,641 A | 3/1976 | Lemelson | |
| 3,957,386 A | 5/1976 | Lupke | |
| 4,042,661 A | 8/1977 | Cook | |
| 4,113,411 A | 9/1978 | Terragni | |
| 4,165,214 A | 8/1979 | Lupke et al. | |
| 4,180,357 A | 12/1979 | Lupke | |
| 4,218,164 A | 8/1980 | Lupke | |
| 4,219,293 A | 8/1980 | Licht | |
| 4,220,181 A | 9/1980 | Nyssen | |
| 4,223,895 A | 9/1980 | Roberts, Jr. et al. | |
| 4,230,157 A | 10/1980 | Larsen et al. | |
| 4,262,162 A | 4/1981 | Plinke et al. | |
| 4,281,981 A | 8/1981 | Feldman | |
| 4,319,476 A | 3/1982 | Fuchs, Jr. | |
| 4,352,701 A | 10/1982 | Shimba et al. | |
| 4,377,545 A * | 3/1983 | Hornbeck | 264/167 |
| 4,397,797 A | 8/1983 | Nojiri et al. | |
| 4,402,658 A | 9/1983 | Larsen | |
| 4,415,389 A | 11/1983 | Medford et al. | |
| 4,436,679 A | 3/1984 | Winstead | |
| 4,439,130 A | 3/1984 | Dickhut et al. | |
| 4,492,551 A | 1/1985 | Hegler et al. | |
| 4,523,613 A | 6/1985 | Fouss et al. | |
| 4,528,832 A | 7/1985 | Fuchs, Jr. | |
| 4,534,923 A | 8/1985 | Lupke | |
| 4,547,246 A | 10/1985 | Viriyayuthakorn et al. | |
| 4,562,990 A | 1/1986 | Rose | |
| 4,572,523 A | 2/1986 | Guettouche et al. | |
| 4,588,546 A | 5/1986 | Feil et al. | |
| 4,666,649 A | 5/1987 | Takubo et al. | |
| 4,678,526 A | 7/1987 | Hawerkamp | |
| 4,683,166 A | 7/1987 | Yuto et al. | |
| 4,703,639 A | 11/1987 | Fuchs, Jr. | |
| 4,756,339 A | 7/1988 | Buluschek | |
| 4,779,651 A | 10/1988 | Hegler et al. | |
| 4,789,327 A | 12/1988 | Chan et al. | |
| 4,808,098 A | 2/1989 | Chan et al. | |
| 4,846,660 A | 7/1989 | Drossbach | |
| 4,849,113 A | 7/1989 | Hills | |
| 4,854,416 A | 8/1989 | Lalikos et al. | |
| 4,862,728 A | 9/1989 | Hardouin | |
| 4,862,924 A | 9/1989 | Kanao | |
| 4,900,503 A | 2/1990 | Hegler et al. | |
| 4,906,496 A | 3/1990 | Hosono et al. | |
| 4,970,351 A | 11/1990 | Kirlin | |
| 5,045,254 A | 9/1991 | Peelman et al. | |
| 5,058,934 A | 10/1991 | Brannon | |
| 5,089,074 A | 2/1992 | Winter et al. | |
| 5,124,109 A | 6/1992 | Drossbach | |
| 5,129,428 A | 7/1992 | Winter et al. | |
| 5,129,429 A | 7/1992 | Winter et al. | |
| 5,129,685 A | 7/1992 | Engel | |
| 5,145,545 A | 9/1992 | Winter et al. | |
| 5,156,901 A | 10/1992 | Tanaka | |
| 5,192,834 A | 3/1993 | Yamanishi et al. | |
| 5,222,288 A | 6/1993 | Thomas | |
| 5,228,479 A | 7/1993 | Thomas | |
| 5,256,233 A | 10/1993 | Winter et al. | |
| 5,262,109 A | 11/1993 | Cook | |
| 5,275,544 A | 1/1994 | Marlowe | |
| 5,279,332 A | 1/1994 | Winter et al. | |
| 5,314,553 A | 5/1994 | Hashimoto et al. | |
| 5,330,600 A | 7/1994 | Lupke | |
| 5,346,384 A | 9/1994 | Hegler et al. | |
| 5,372,774 A | 12/1994 | Lupke | |
| 5,383,497 A | 1/1995 | Winter et al. | |
| 5,383,998 A | 1/1995 | Lupke | |
| 5,391,334 A | 2/1995 | Enomoto | |
| 5,394,904 A | 3/1995 | Winter et al. | |
| 5,441,083 A | 8/1995 | Korsgaard | |
| 5,460,771 A | 10/1995 | Mitchell et al. | |
| 5,462,090 A | 10/1995 | Winter et al. | |
| 5,466,402 A | 11/1995 | Lupke | |
| 5,469,892 A | 11/1995 | Noone et al. | |
| 5,472,659 A | 12/1995 | Hegler et al. | |
| 5,472,746 A | 12/1995 | Miyajima et al. | |
| 5,522,718 A | 6/1996 | Dietrich | |
| 5,531,952 A | 7/1996 | Hatfield | |
| 5,545,369 A | 8/1996 | Lupke | |
| 5,572,917 A | 11/1996 | Truemner et al. | |
| 5,608,637 A | 3/1997 | Wang et al. | |
| 5,620,722 A | 4/1997 | Spina | |
| 5,649,713 A | 7/1997 | Ledgerwood | |
| 5,706,864 A | 1/1998 | Pfleger | |
| 5,715,870 A | 2/1998 | Winter et al. | |
| 5,759,461 A | 6/1998 | Jarvenkyla et al. | |
| 5,773,044 A | 6/1998 | Dietrich et al. | |
| 5,848,618 A | 12/1998 | Guest | |
| 5,894,865 A | 4/1999 | Winter et al. | |
| 5,901,754 A | 5/1999 | Elsässer et al. | |
| 5,904,643 A | 5/1999 | Seeberger et al. | |
| 5,909,908 A | 6/1999 | Furuse | |
| 5,912,023 A | 6/1999 | Katoh et al. | |
| 5,975,143 A | 11/1999 | Järvenkylä et al. | |
| 5,976,298 A | 11/1999 | Hegler et al. | |
| 6,000,434 A | 12/1999 | Winter et al. | |
| 6,016,848 A | 1/2000 | Egres, Jr. | |
| 6,039,082 A | 3/2000 | Winter et al. | |
| 6,062,268 A | 5/2000 | Elsässer et al. | |
| 6,082,741 A | 7/2000 | Gregoire et al. | |
| 6,161,591 A | 12/2000 | Winter et al. | |
| 6,186,182 B1 | 2/2001 | Yoon | |
| 6,199,592 B1 | 3/2001 | Siferd et al. | |
| 6,240,969 B1 | 6/2001 | Wildermuth | |
| 6,335,101 B1 | 1/2002 | Haeger et al. | |
| 6,399,002 B1 | 6/2002 | Lupke et al. | |
| 6,405,974 B1 | 6/2002 | Herrington | |
| 6,461,078 B1 | 10/2002 | Presby | |
| 6,491,994 B1 | 12/2002 | Kito et al. | |
| 6,524,519 B1 | 2/2003 | Ohba et al. | |
| 6,555,243 B2 | 4/2003 | Flepp et al. | |
| 6,591,871 B2 | 7/2003 | Smith et al. | |
| 6,607,010 B1 | 8/2003 | Kashy | |
| 6,631,741 B2 | 10/2003 | Katayama et al. | |
| 6,645,410 B2 | 11/2003 | Thompson | |
| 6,682,677 B2 | 1/2004 | Lobovsky et al. | |
| 6,696,011 B2 | 2/2004 | Yun et al. | |
| 6,719,302 B2 | 4/2004 | Andrick | |
| 6,787,092 B2 | 9/2004 | Chan et al. | |
| 6,848,464 B2 | 2/2005 | Ransom | |
| 6,848,478 B2 | 2/2005 | Nagai | |
| 6,854,168 B2 | 2/2005 | Booms et al. | |
| 6,933,028 B2 | 8/2005 | Milhas | |
| 6,935,378 B2 | 8/2005 | Ikemoto et al. | |
| 6,955,780 B2 | 10/2005 | Herrington | |
| 7,074,027 B2 | 7/2006 | Starita | |
| 7,114,944 B2 | 10/2006 | Wolfe et al. | |
| 7,118,369 B2 | 10/2006 | Dietrich et al. | |
| 7,122,074 B2 | 10/2006 | Kim | |
| 7,140,859 B2 | 11/2006 | Herrington | |
| 7,156,128 B1 * | 1/2007 | Kanao | 138/133 |
| 7,185,894 B2 | 3/2007 | Kish et al. | |
| 7,347,225 B2 | 3/2008 | Nobileau | |
| 2002/0179232 A1 | 12/2002 | Thompson | |
| 2003/0090082 A1 * | 5/2003 | Baughman et al. | 285/903 |
| 2004/0146696 A1 | 7/2004 | Jones | |
| 2004/0150170 A1 | 8/2004 | Shaffer et al. | |
| 2004/0187946 A1 | 9/2004 | Herrington | |
| 2004/0241368 A1 | 12/2004 | Iwata et al. | |
| 2004/0262923 A1 * | 12/2004 | Hegler | 285/374 |
| 2005/0161947 A1 | 7/2005 | Skinner et al. | |
| 2006/0293159 A1 | 12/2006 | Neubauer | |

(56) References Cited

U.S. PATENT DOCUMENTS

| | | |
|---|---|---|
| 2007/0204929 A1 | 9/2007 | Jarvenkyla |
| 2008/0118596 A1 | 5/2008 | Hetzner et al. |
| 2008/0210327 A1 | 9/2008 | Goddard et al. |

FOREIGN PATENT DOCUMENTS

| | | | |
|---|---|---|---|
| EP | 595742 A1 * | 5/1994 | ............ F16L 37/252 |
| GB | 2 300 684 | 11/1996 | |
| JP | 56144943 | 11/1981 | |
| JP | 57160518 | 10/1982 | |
| JP | 58168422 | 10/1983 | |
| JP | 59114027 | 6/1984 | |
| JP | 61135416 | 6/1986 | |
| JP | 2003062891 | 3/2003 | |
| WO | WO 98/12046 | 3/1998 | |
| WO | WO 00/31457 | 6/2000 | |
| WO | WO 02/38999 | 5/2002 | |
| WO | WO 03/040604 | 5/2003 | |

* cited by examiner

MULTI-WALL CORRUGATED PIPE COUPLINGS AND METHODS

RELATED APPLICATION

This application is a continuation-in-part of U.S. patent application Ser. No. 11/941,605, which was filed on Nov. 16, 2007, and is hereby incorporated herein by reference.

TECHNICAL FIELD

The present disclosure relates to three-wall corrugated pipe couplings and methods, and more particularly, to a water-tight, in-line, bell and spigot for coupling three-wall corrugated pipe.

BACKGROUND

Corrugated pipe sections are used in the drainage of water-saturated soil in various agricultural, residential, recreational, or civil engineering and construction applications, such as for storm sewers. Traditionally, drainage pipe was made from clay or concrete, which caused the pipe to be heavy, expensive, and brittle. In order to improve the cost-effectiveness, durability, and ease-of-installation of drainage pipes, it is now common in the art to manufacture them from various materials including various polymers and polymer blends.

Such plastic drainage pipe is generally extruded, molded, and cut to form relatively light, manageable, and transportable sizes of drainage pipe sections, ranging from a few feet to many yards in length. Once these plastic pipe sections are transported to their desired installation location, they are assembled lengthwise by the installation of joints, adhesives, or other coupling means. This coupling process has generally been complex, requiring the transportation of many tools and supplies to the job site, and has required many man-hours for completion.

For example, one method of assembly involves the formation of a wide-diameter bell at one end of each plastic pipe section. During the pipe manufacturing process, an apparatus known as a "beller" is used to radially expand the end of the pipe, forming an expanded bell-shaped structure, such that the opposite end of an adjacent pipe section may be inserted into the expanded bell-shaped end. This process has several disadvantages.

First of all, these pipe bells are generally weakened during their expansion and require additional means of reinforcement, such as external straps, hinged brackets, overlapping wraps, shrink-wrap layers, or a combination of such reinforcement means. In some instances, more material must be used at the pipe bell ends to compensate for reduced strength, thereby increasing weight and expense. Moreover, because the pipe bells are expanded to diameters larger than the central portion of the pipe, it becomes necessary to dig trenches that can accommodate the larger bell. Finally, these bells and other known coupling means require precise and careful excavation, installation, and backfill, to avoid misalignment between pipe sections during assembly and placement. The improper installation of these coupling means often results in joint failure, buckling, and an inability to form a water-tight seal between adjacent pipe sections.

The above problems, which are known to exist in relation to single- and dual-wall pipe, can be even more troublesome in three-wall pipe applications. For example, it may be substantially more difficult and expensive to form a bell-shaped end on a section of three-wall, corrugated pipe, due to increased material weight and stiffness.

Accordingly, there is a need for an improved water-tight, in-line, bell and spigot, which can be used for coupling sections of three-wall, corrugated pipe.

SUMMARY OF THE INVENTION

It is an object of the present invention to provide such an improved water-tight, in-line, bell and spigot design for coupling adjacent sections of three-wall corrugated pipe.

One exemplary embodiment of the present disclosure provides a coupling for three-wall, corrugated pipe, the pipe including a corrugated wall having a plurality of primary corrugations. The coupling includes: a first pipe section having disposed at one end a bell portion, the bell portion having a bell portion of corrugated wall and an outer wall; a second pipe section having disposed at one end a spigot portion, the spigot portion having a spigot portion of corrugated wall between an inner wall and an outer wall; and a gasket disposed in a groove extending around a circumference of the spigot portion and engaged between the bell portion of corrugated wall and the spigot portion of corrugated wall.

Another exemplary embodiment provides a three-wall, corrugated pipe section design. The corrugated pipe section includes: a spigot portion disposed at a first end of the corrugated pipe section; a bell portion disposed at a second end of the corrugated pipe section; and a central portion disposed between the spigot portion and the bell portion, the central portion having a corrugated wall disposed between an inner wall and an outer wall, wherein the spigot portion has a gasket retained in a groove extending around a circumference of the spigot portion.

Yet another exemplary embodiment of the present invention provides a method of coupling three-wall, corrugated pipe. The method includes: providing a first three-wall, corrugated pipe section, having disposed at one end a spigot portion, the spigot portion having a spigot portion of the corrugated wall between an inner wall and an outer wall, the spigot portion of the corrugated wall having a groove around a circumference of one of its corrugations; providing a second three-wall, corrugated pipe section, having disposed at one end a bell portion, the bell portion having a bell portion of the corrugated wall and an outer wall; inserting a gasket into the groove of the spigot portion of the corrugated wall; and inserting the spigot portion into the bell portion such that the gasket engages the bell portion of the corrugated wall.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings illustrate certain exemplary embodiments of the invention, and together with the description, serve to explain the principles of the invention.

As such, those skilled in the art will appreciate that the conception upon which this disclosure is based may readily be utilized as a basis for designing other structures, methods, and systems for carrying out the several purposes of the present invention. It is important, therefore, to recognize that the claims should be regarded as including such equivalent

DESCRIPTION OF THE EXEMPLARY EMBODIMENTS

Reference will now be made in detail to the exemplary embodiments of the invention described above and illustrated in the accompanying drawings.

Figure 1:
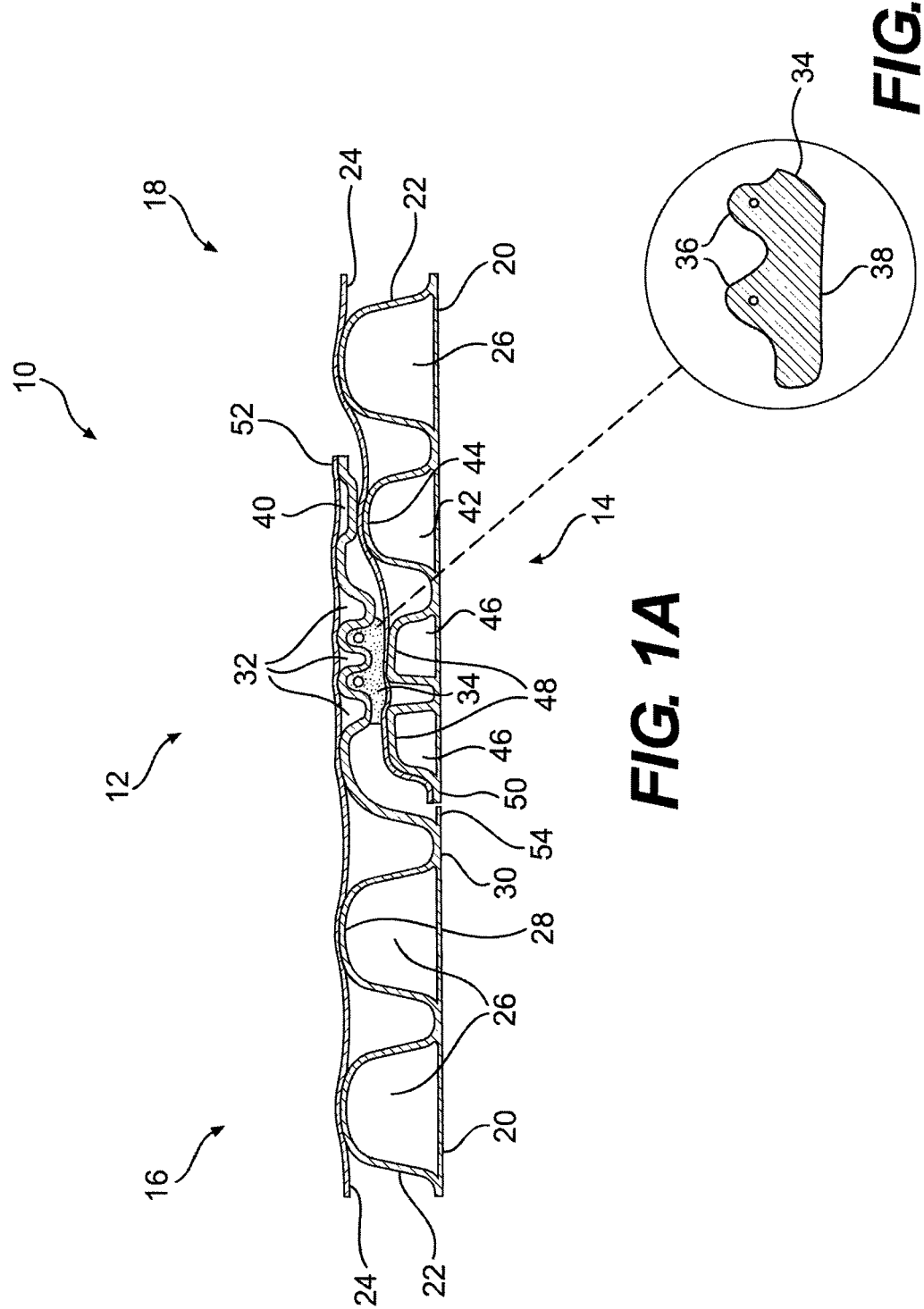
FIG. 1A is a partial, cross-sectional view of an exemplary coupling for joining two segments of three-wall, corrugated pipe.
FIG. 1B is a cross-sectional view of an exemplary gasket for use in the coupling of FIG. 1A.

FIG. 1A illustrates an exemplary coupling portion 10 for coupling a first corrugated pipe section 16 and a second corrugated pipe section 18. In general, coupling portion 10 may include a bell portion 12 disposed on an end of first corrugated pipe section 16 and a spigot portion 14 disposed on an end of second corrugated pipe section 18. Coupling portion 10 may also include a gasket 34, for retaining and sealing spigot portion 14 within bell portion 12.

In one embodiment, first and second corrugated pipe sections 16, 18 may be initially formed as dual-wall, corrugated pipe. For example, both first and second corrugated pipe sections 16, 18 include an inner wall 20 and a corrugated wall 22, which may be formed together on a corrugator. In another embodiment of the present invention, inner wall 20 may be separately fused to corrugated wall 22. Corrugated wall 22 may include a plurality of primary corrugations 26, each having respective primary corrugation crests 28 and primary corrugation valleys 30. This dual-wall, corrugated pipe may then be passed through a downstream, cross-head die, which extrudes an outer wall 24 onto the dual-wall pipe, as illustrated in FIG. 1A, thereby creating three-wall, corrugated pipe. Because outer wall 24 is extruded onto corrugated wall 22 while it is still hot (i.e., in a melted or semi-melted state), it may be fused or covalently bonded to primary corrugation crests 28 of corrugated wall 22. In certain exemplary embodiments, inner wall 20 may be substantially smooth, as illustrated in FIG. 1A.

Referring in particular to coupling portion 10, bell portion 12 and spigot portion 14 may be formed integrally with three-wall corrugated pipe, such that their assembly results in a coupling having a diameter substantially similar to that of the rest of the pipe. In other words, the outer diameter of the three-wall corrugated pipe may be substantially the same at the bell and spigot portions 12, 14 as the outer diameter at various locations of primary corrugations 26.

Specifically, as illustrated in FIG. 1A, bell portion 12 may include outer wall 24 and a portion of corrugated wall 22 having smaller bell corrugations 32 formed therein. For example, bell portion 12 may include three bell corrugations 32, which are configured to engage and retain protrusions 36 of gasket 34, as illustrated in FIG. 1B. Bell portion 12 may also include an end corrugation 40 disposed proximate to an end portion of the bell, i.e., between bell corrugations 32 and bell terminus 52. As further illustrated in FIG. 1A, the height of bell corrugations 32, measured from the outer wall to the bottoms of the bell corrugations 32, may be substantially less than the primary height of primary corrugations 26, measured from the outer wall to the bottoms of the primary corrugations 26 (primary corrugation valleys 30). Moreover, the height of end corrugation 40, measured from the outer wall to the bottom of end corrugation 40, may be even less than the height of bell corrugations 32. End corrugation 40 may have a different shape than that of primary corrugations 26 and bell corrugations 32. More specifically, end corrugation 40 may have a substantially rectangular shape. Because of the reduction in height of bell corrugations 32, without a change in outside pipe diameter, first corrugated pipe section 16 may form an in-line, bell-shaped portion for receiving spigot portion 14.

Spigot portion 14 may include inner wall 20, a portion of corrugated wall 22 having smaller spigot corrugations 46 formed therein, and a portion of outer wall 24 drawn down over spigot corrugations 46. Spigot portion 14 may also include an intermediate corrugation 42 disposed between spigot corrugations 46, located adjacent spigot terminus 50, and primary corrugations 26 of second corrugated pipe section 18. As illustrated in FIG. 1A, the height of spigot corrugations 46, measured from inner wall 20 to the top of spigot corrugations 46 (spigot corrugation crests 48), may be less than the height of intermediate corrugation 42, measured from inner wall 20 to the top of intermediate corrugation 42 (intermediate corrugation crest 44). Accordingly, the height of intermediate corrugation 42 may be less than the height of primary corrugations 26. Thus, outer wall 24 may be circumferentially tapered over spigot portion 14.

As illustrated in the embodiment of FIG. 1A, primary corrugations 26 and intermediate corrugation 42 may have generally curved shapes, including rounded shoulder portions. Likewise, spigot corrugations 46 may have generally curved profile shapes. Alternatively, each of the spigot corrugations 46 may include at least one substantially sharp corner, thereby forming a relatively right angle, shoulder portion. Thus, spigot corrugations 46 may each further include at least one substantially straight side. Because of the reduction in corrugation height in the direction approaching spigot terminus 50, a decreased-diameter spigot portion 14 may be formed so as to telescopically engage the bell portion 12.

Upon proper dimensional control of bell portion 12 and spigot portion 14, a water-tight seal may be formed therebetween. For instance, as illustrated in FIG. 1A, end corrugation 40 of bell portion 12 may contact the portion of outer wall 24 fused to intermediate corrugation 42 of spigot portion 14. Likewise, referring to FIG. 1B, an inner sealing surface 38 of gasket 34 may contact a portion of outer wall 24 fused to one or more of spigot corrugations 46.

In the embodiment of FIG. 1A, gasket 34 engages a surface of outer wall 24 spanning two spigot corrugations 46. In alternative embodiments of the present disclosure, it is contemplated that gasket 34 may be configured to engage only one spigot corrugation 46 or many spigot corrugations 46. For example, in the event that gasket 34 engages a single spigot corrugation 46, it may be necessary to fill the corrugation with foam, or any other suitable reinforcing material to ensure sufficiently resilient support of gasket 34. For this reason, two smaller spigot corrugations 48, such as those illustrated in FIG. 1A, may be used to provide increased structural support (i.e., vertical corrugation walls) for sealing against gasket 34. Moreover, the length of sealing engagement between gasket 34 and outer wall 24 of spigot portion 14 may be any suitable length; however, in one exemplary embodiment, spigot corrugations 46 extend axially across 4-8 inches of pipe and are fused to a portion of outer wall 24. Gasket 34 may extend and overlap approximately 3-4 inches in the axial pipe direction of the portion of outer wall 24 fused to spigot corrugations 46, gasket 34 having a sealing surface 38 approximately 2-4 inches long. Thus, sealing surface 38 of gasket 34 may be configured to engage the outer wall 24 of spigot portion 14.

Gasket 34 may be any suitable type of annular, water-tight gasket. For example, gasket 34 may be a dual-elastomer gasket including any suitable type of material, such as rubber, polyethylene, Teflon, EPDM, nitrile, thermoplastic elastomers, isoprene, or other plastic compounds. Gasket 34 may also incorporate various metal inserts or rings, as necessary, to provide structural rigidity.

Figure 2:
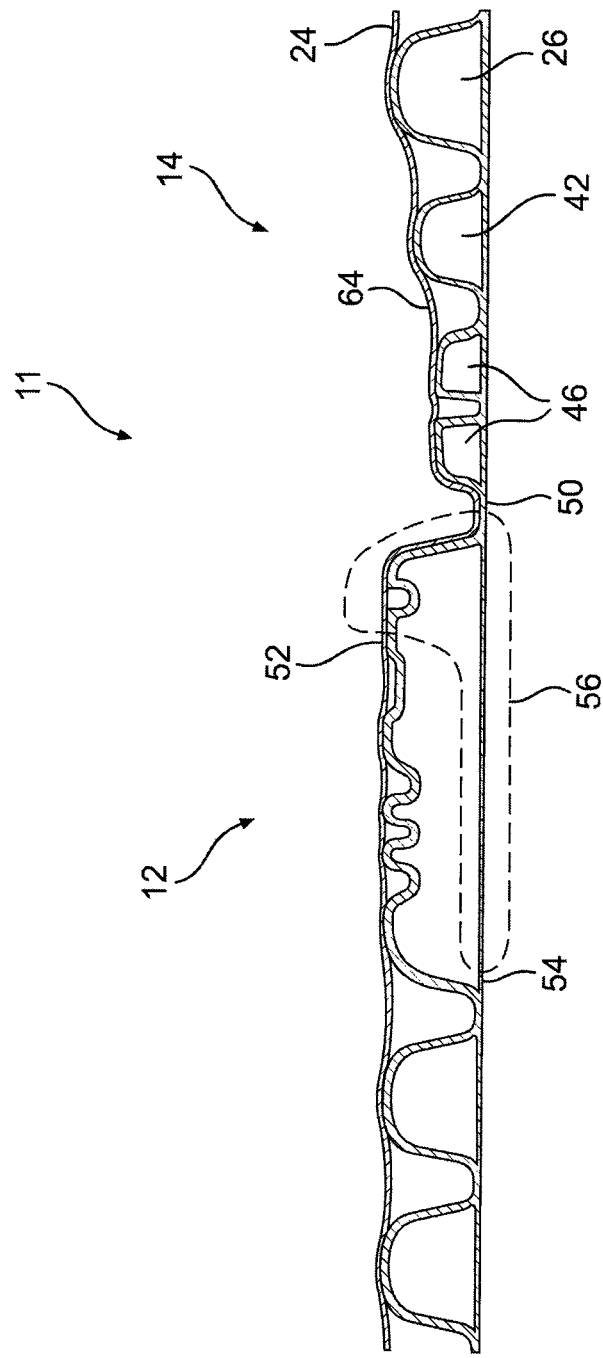
FIG. 2 is a partial, cross-sectional view of an exemplary extruded, three-wall, corrugated pipe having a molded preform therein, which can be formed into a coupling.

FIG. 2 illustrates an exemplary, partial section of three-wall, corrugated pipe during manufacturing of a coupling preform 11 prior to cutting of the pipe. As described above with respect to FIG. 1A, coupling portion 10, including bell portion 12 and spigot portion 14, may be formed "in-line" with the rest of the three-wall corrugated pipe. Accordingly, FIG. 2 illustrates a coupling preform 11, having bell portion 12 and spigot portion 14 of three-wall, corrugated pipe, after having been extruded from a cross-head die but before having been cut into separate portions. As illustrated in FIG. 2, a portion of outer wall 24 constituting spigot outer wall 64 has been drawn down over, and fused or covalently bonded to, intermediate corrugation 42 and spigot corrugations 46. Moreover, spigot outer wall 64 may be drawn down adjacent to spigot terminus 50, such that all three walls of the corrugated pipe are in contact between spigot portion 14 and bell portion 12 of coupling preform 11. Because the walls have been drawn down together, a scrap portion 56 of coupling preform 11 (indicated by dashed lines on FIG. 2) may be easily removed by making cuts proximate to spigot terminus 50, bell terminus 52, and inner wall terminus 54.

Any suitable method may be used for drawing down outer wall 24 onto various corrugations or valleys of corrugated wall 22. For example, in one embodiment, a plurality of rollers may be used to press outer wall 24 onto primary corrugations 26, intermediate corrugation 42, and spigot corrugations 46. Alternatively, in another embodiment, vacuum suction may be applied, for example, by a hollow needle, between corrugation crests to create downward force on outer wall 24, as desired. In order to facilitate this vacuum deformation, various channels and access passageways may be incorporated into the molds, used to shape the outer and/or corrugated walls, as necessary.

Figure 3:
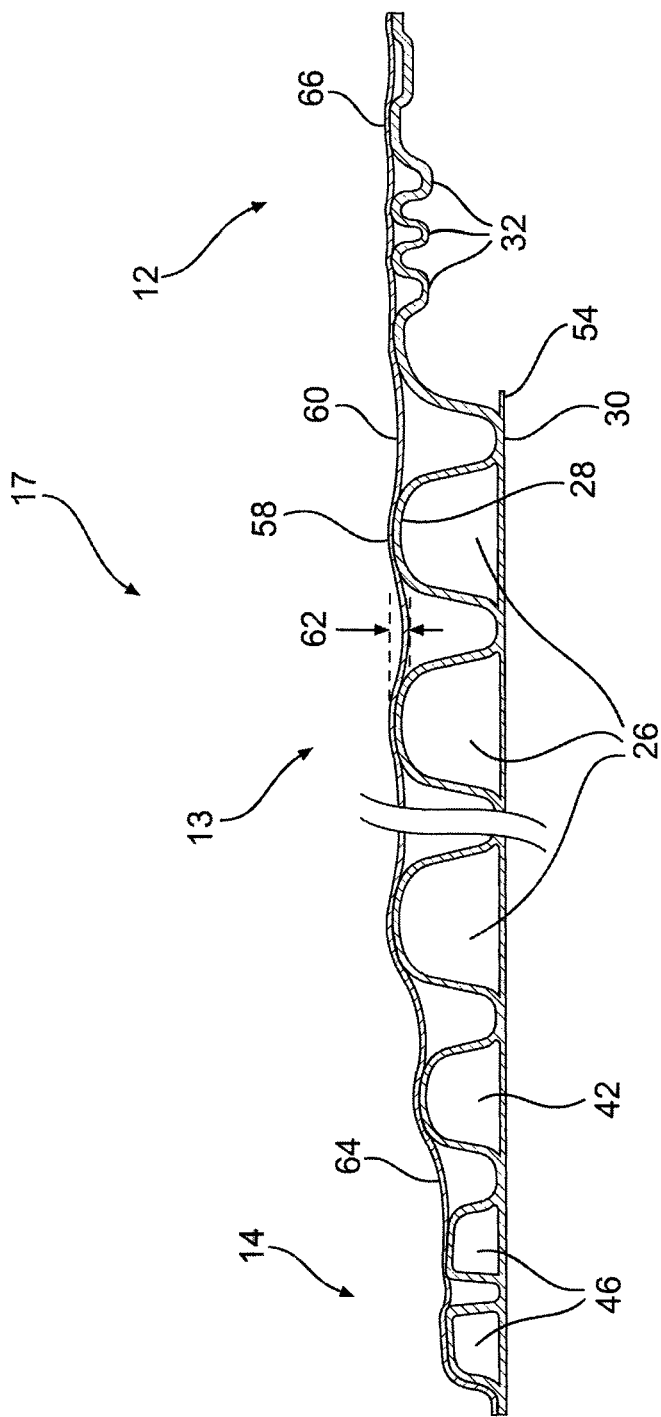
FIG. 3 is a partial, cross-sectional view of an exemplary three-wall pipe having an in-line, bell and spigot formed therein.
Figure 4:
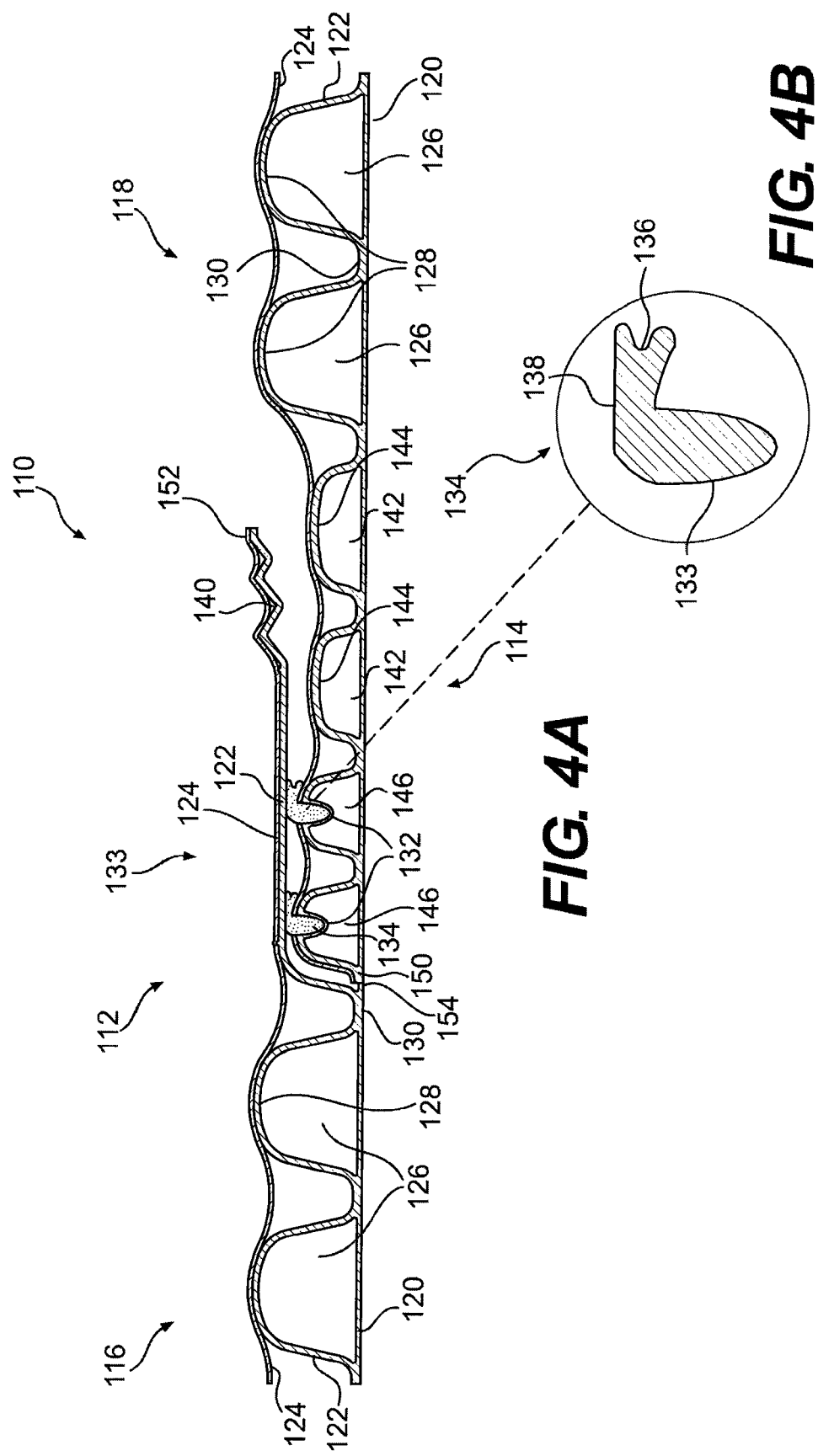
FIG. 4A is a partial, cross-sectional view of an alternative exemplary coupling for joining two segments of three-wall, corrugated pipe.
FIG. 4B is a cross-sectional view of an alternative exemplary gasket for use in the coupling of FIG. 4A.

FIG. 3 illustrates an exemplary embodiment of a corrugated pipe section 17, having bell portion 12 at a first end and spigot portion 14 at a second end. A primary pipe portion 13, having primary corrugations 26, may be disposed between bell portion 12 and spigot portion 14. Primary pipe portion 13 may extend from a few feet to many yards in length.

In certain embodiments, each corrugated pipe section 17 may be manufactured such that its outer wall 24 (including spigot outer wall 64 and bell outer wall 66) is at least partially corrugated. For example, outer wall 24 may include a plurality of outer wall crests 58 and outer wall valleys 60. As illustrated in FIG. 3, outer wall crests 58 may be axially aligned with primary corrugation crests 28, while outer wall valleys 60 may be axially aligned with primary corrugation valleys 30. Alternatively, in another embodiment, outer wall crests 58 may be aligned with primary corrugation valleys 30, whereas outer wall valleys 60 may be aligned with primary corrugation crests 28. In one embodiment, the radial distance from the top of an outer wall crest to the bottom of an adjacent outer wall valley (i.e., the "wave height") may be between 0.0 and 0.25 inches. In a further embodiment, the wave height may be between 0.15 and 0.25 inches.

Upon the manufacture of a plurality of corrugated pipe sections 17, such as the pipe section illustrated in FIG. 3, a system of corrugated pipes may be quickly and easily arranged and coupled lengthwise, from end to end. Specifically, spigot portion 14 of a first corrugated pipe section may be inserted into bell portion 12 of a second pipe section, as discussed with respect to FIG. 1A.

Although FIGS. 1A-3 illustrate one particular exemplary embodiment of the present disclosure, it will be appreciated by one of skill in the art that numerous other variations on the geometry of cooperating in-line bell and spigot portions are contemplated within the scope of this disclosure. For example, FIGS. 4A-6 illustrate alternative exemplary embodiments of cooperating in-line bell and spigot portions having alternative geometries for retaining one of more gaskets between in-line bell and spigot portions.

Specifically, FIG. 4A illustrates an exemplary coupling portion 110 for coupling a first corrugated pipe section 116 and a second corrugated pipe section 118. In general, coupling portion 110 may include a bell portion 112 disposed on an end of first corrugated pipe section 116 and a spigot portion 114 disposed on an end of second corrugated pipe section 118. Coupling portion 110 may also include one or more gaskets 134, for retaining and sealing spigot portion 114 within bell portion 112.

In one embodiment, first and second corrugated pipe sections 116, 118 may be initially formed as dual-wall, corrugated pipe. For example, both first and second corrugated pipe sections 116, 118 include an inner wall 120 and a corrugated wall 122, which may be formed together on a corrugator. In another embodiment of the present invention, inner wall 120 may be separately fused to corrugated wall 122. Corrugated wall 122 may include a plurality of primary corrugations 126, each having respective primary corrugation crests 128 and primary corrugation valleys 130. This dual-wall, corrugated pipe may then be passed through a downstream, cross-head die, which extrudes an outer wall 124 onto the dual-wall pipe, as illustrated in FIG. 4A, thereby creating three-wall, corrugated pipe. Because outer wall 124 is extruded onto corrugated wall 122 while outer wall 124 is still hot (i.e., in a melted or semi-melted state), outer wall 124 may be fused or covalently bonded to primary corrugation crests 128 of corrugated wall 122. In certain exemplary embodiments, inner wall 120 may be substantially smooth, as illustrated in FIG. 4A.

Referring in particular to coupling portion 110, bell portion 112 and spigot portion 114 may be formed integrally with three-wall corrugated pipe, such that the assembly of bell portion 112 and spigot portion 114 results in a coupling having a diameter substantially similar to that of the rest of the pipe. In other words, the outer diameter of the three-wall corrugated pipe may be substantially the same at the bell and spigot portions 112, 114 as the outer diameter at various locations of primary corrugations 126.

As illustrated in FIG. 4A, bell portion 112 may include outer wall 124 and a portion of corrugated wall 122 joined together along a substantially straight sealing portion 133. Specifically, bell portion 112 may include a sealing portion 133 configured to engage and retain sealing surfaces 138 of gaskets 134 with an inner surface of corrugated wall 122, as illustrated in FIG. 4B. Because bell portion 112 may include both outer wall 124 and corrugated wall 122 fused together along sealing portion 133, bell portion 112 may have increased strength and resistance to deformation as compared to a single layer bell portion. Bell portion 112 may also include one or more end corrugations 140 disposed proximate to an end portion of the bell, i.e., between sealing portion 133 and bell terminus 152. Thus, outer wall 124 and corrugated wall 122 may be substantially fused together along sealing portion 133, such that at least one or more sections of outer wall 124 and corrugated wall 122 are covalently bonded to each other along sealing portion 133.

Spigot portion 114 may include inner wall 120, a portion of corrugated wall 122 having spigot corrugations 146 formed therein, and a portion of outer wall 124 drawn down over spigot corrugations 146. Spigot portion 114 may also include intermediate corrugations 142 disposed between spigot corrugations 146, located adjacent spigot terminus 150, and primary corrugations 126 of second corrugated pipe section 118. As illustrated in FIG. 4A, the height of spigot corrugations 146, measured from inner wall 120 to the top of spigot corrugations 146 may be greater than the height of intermediate corrugations 142, measured from inner wall 120 to the top of intermediate corrugations 142 (intermediate corrugation crests 144). However, the height of spigot corrugations 146 may be less than the height of primary corrugations 126. Thus, a portion of outer wall 124 disposed around intermediate corrugations 142 may be the smallest diameter portion of the pipe, such that first corrugated pipe section 116 can articulate relative to second corrugated pipe section 118 without contact interference between bell terminus 152 and the portion of outer wall 124 fused to intermediate corrugations 142.

As illustrated in the embodiment of FIG. 4A, primary corrugations 126 and intermediate corrugations 142 may have generally curved shapes, including rounded shoulder portions. Likewise, spigot corrugations 146 may have generally curved profile shapes. However, spigot corrugations 146 may each include a groove 132 formed around its circumference. As shown in FIG. 4A, the portions of outer wall 124 extending over grooves 132 may be removed, such that an engagement projection 133 of each gasket 134 may be inserted into a groove 132 of a spigot corrugation 146. Because outer wall 124 extends over and is fused to spigot corrugations 146 and intermediate corrugations 142 along their lengths, except over grooves 132, spigot portion 114 may have increased strength and resistance to deformation as compared to a spigot portion having only two walls. In the embodiment of FIG. 4A, spigot portion 114 includes two spigot corrugations 146, each having gasket 134 inserted into its respective groove 132. It will be appreciated, however, that spigot portion 114 may have any number of spigot corrugations 146. Moreover, each spigot corrugation 146 may be provided with any number of grooves 132 and gaskets 134, as desired. Spigot corrugations 146 may also be reinforced by the injection of foam into an interior of each of spigot corrugations 146.

Because of the reduction in corrugation height of spigot corrugations 146 relative to primary corrugations 126, a decreased-diameter spigot portion 114 may be formed so as to telescopically engage bell portion 112. Specifically, upon proper dimensional control of bell portion 112 and spigot portion 114, a water-tight seal may be formed therebetween. For instance, referring to both FIGS. 4A and 4B, a sealing surface 138 of each gasket 134 may contact a sealing portion 133 of corrugated wall 122 fused to outer wall 124. Because corrugated wall 122 is smoothed against outer wall 124 along sealing portion 133, each gasket 134 may be disposed at a substantially similar diameter of spigot portion 114. However, if sealing portion 133 is profiled so as to change diameters along its length, then gaskets 134 may be disposed at corresponding diameters so as to ensure their sealing engagement with corrugated wall 122. The length of sealing engagement between gaskets 134 and corrugated wall 122 may be any suitable length. For example, in one exemplary embodiment, spigot corrugations 146 may extend axially across 2-8 inches of pipe. Gaskets 134 may also extend and overlap approximately 2-8 inches in the axial pipe direction, each gasket 134 having a sealing surface 138 approximately 1-4 inches long. Thus, sealing surfaces 138 of each gasket 134 may be configured to engage the corrugated wall 122 of sealing portion 133 of bell portion 112.

Each gasket 134 may be any suitable type of annular, water-tight gasket. For example, gasket 134 may be dual-elastomer gaskets including any suitable type of material, such as rubber, polyethylene, Teflon, EPDM, nitrile, thermoplastic elastomers, isoprene, or other plastic compounds. Gasket 134 may also incorporate various metal inserts or rings, as necessary, to provide structural rigidity. As shown in FIG. 4B, each gasket 134 may include a V-shaped shoulder 136 configured to ease insertion of spigot portion 114 into bell portion 112 by minimizing the likelihood of rotating gasket 134. For example, each gasket 134 may be selected from one of the gasket types disclosed in U.S. Pat. No. 6,948,718 issued to William V. Shaffer and William C. Andrick on Sep. 27, 2005; U.S. Pat. No. 7,331,582 issued to William V. Shaffer and William C. Andrick on Feb. 19, 2008; or U.S. Pat. No. 7,185,894 issued to Kevin S. Kish and Pardeep K. Sharma on Mar. 6, 2007, (all assigned to Advanced Drainage Systems, Inc.).

Figure 5:
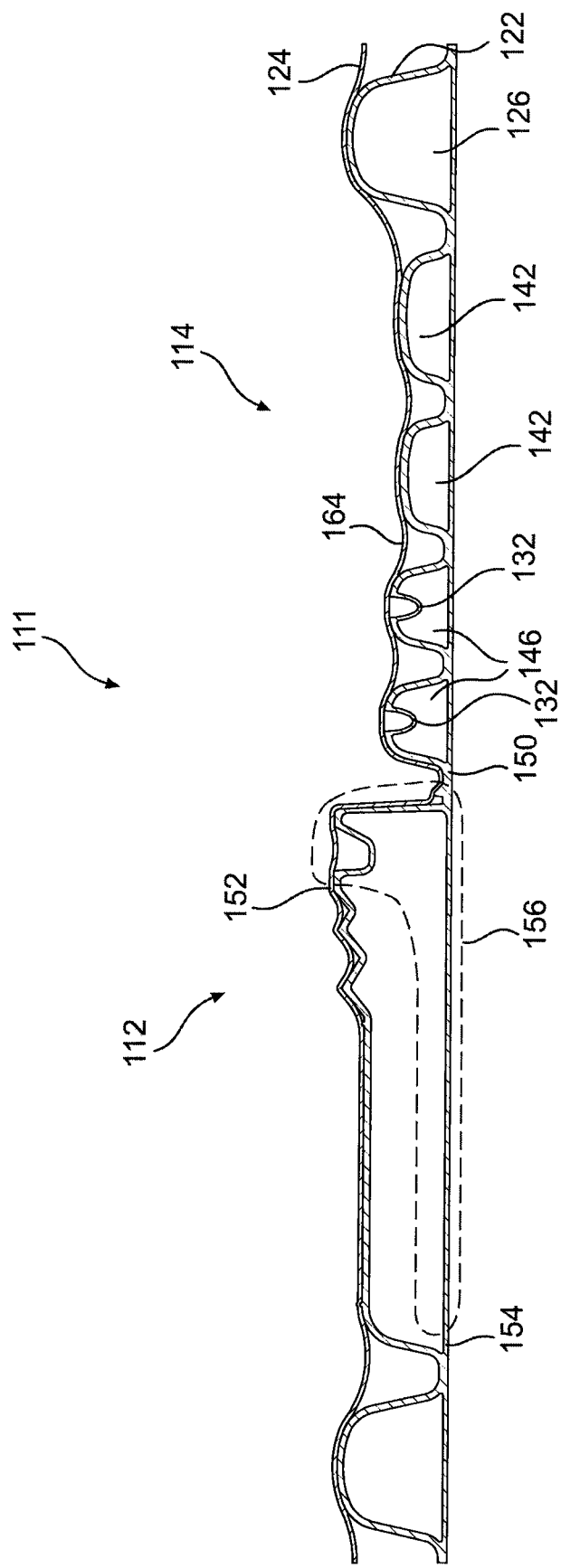
FIG. 5 is a partial, cross-sectional view of an alternative exemplary extruded, three-wall, corrugated pipe having a molded preform therein, which can be formed into a coupling.

FIG. 5 illustrates an exemplary, partial section of three-wall, corrugated pipe during manufacturing of a coupling preform 111 prior to cutting of the pipe. As described above with respect to FIG. 4A, a coupling portion 110, including bell portion 112 and spigot portion 114, may be formed "in-line" with the rest of the three-wall corrugated pipe. Accordingly, FIG. 5 illustrates a coupling preform 111, having bell portion 112 and spigot portion 114 of three-wall, corrugated pipe, after having been extruded from a crosshead die but before having been cut into separate portions. As illustrated in FIG. 5, a portion of outer wall 124 constituting spigot outer wall 164 has been drawn down over, and fused or covalently bonded to, intermediate corrugations 142 and spigot corrugations 146. Moreover, spigot outer wall 164 may be drawn down adjacent to spigot terminus 150, such that all three walls of the corrugated pipe are in contact between spigot portion 114 and bell portion 112 of coupling preform 111. Because the walls have been drawn down together, a scrap portion 156 of coupling preform 111 (indicated by dashed lines on FIG. 5) may be easily removed by making cuts proximate to spigot terminus 150, bell terminus 152, and inner wall terminus 154. Moreover, as described above with respect to FIG. 4A, the portions of outer wall 124 extending over grooves 132 may be removed using a cutter or any other suitable means such that gaskets may be inserted into grooves 132 of spigot portion 114.

Any suitable method may be used for drawing down outer wall 124 onto various corrugations or valleys of corrugated wall 122. For example, in one embodiment, a plurality of rollers may be used to press outer wall 124 onto primary corrugations 126, intermediate corrugations 142, and spigot corrugations 146. Alternatively, in another embodiment, vacuum suction may be applied, for example, by a hollow needle, between corrugation crests to create downward force on outer wall 124, as desired. In order to facilitate this vacuum deformation, various channels and access passageways may be incorporated into the molds, used to shape the outer and/or corrugated walls, as necessary.

Figure 6:
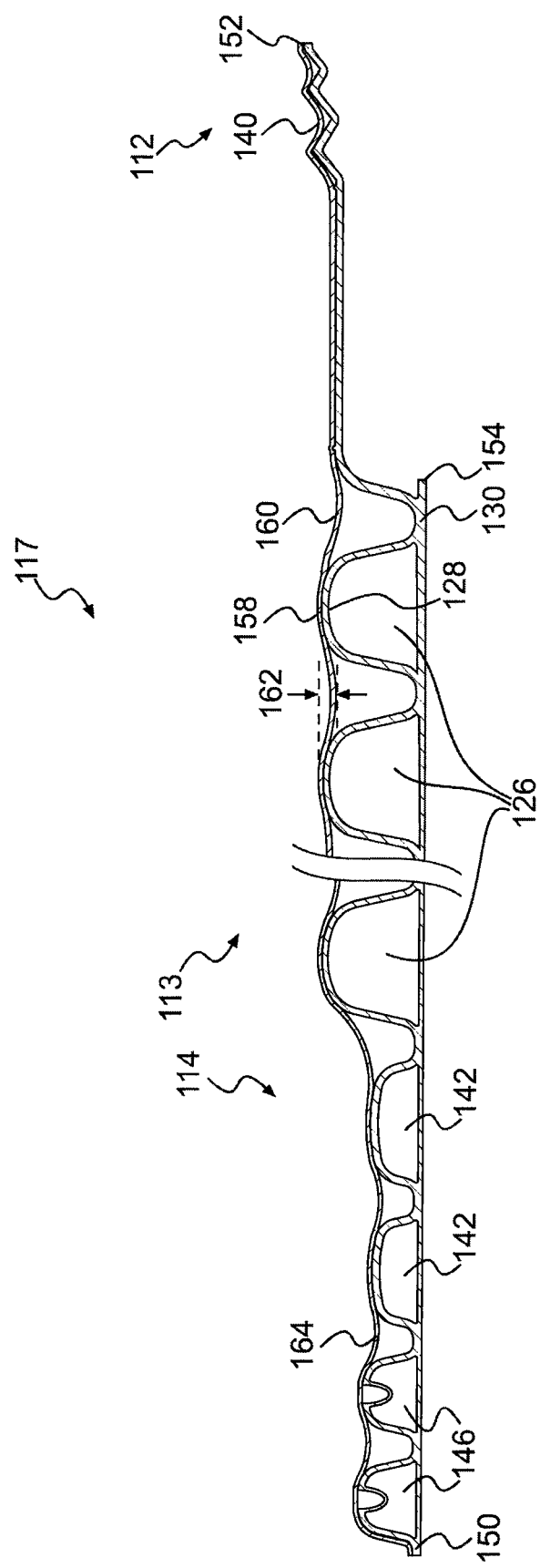
FIG. 6 is a partial, cross-sectional view of an alternative exemplary three-wall pipe having an in-line, bell and spigot formed therein.

FIG. 6 illustrates an exemplary embodiment of a corrugated pipe section 117, having bell portion 112 at a first end and spigot portion 114 at a second end. A primary pipe portion 113, having primary corrugations 126, may be disposed between bell portion 112 and spigot portion 114. Primary pipe portion 113 may extend from a few feet to many yards in length.

In certain embodiments, each corrugated pipe section 117 may be manufactured such that its outer wall 124 (including spigot outer wall 164 and bell outer wall 166) is at least partially corrugated. For example, outer wall 124 may include a plurality of outer wall crests 158 and outer wall valleys 160. As illustrated in FIG. 6, outer wall crests 158 may be axially aligned with primary corrugation crests 128, while outer wall valleys 160 may be axially aligned with primary corrugation valleys 130. Alternatively, in another embodiment, outer wall crests 158 may be aligned with primary corrugation valleys 130, whereas outer wall valleys 160 may be aligned with primary corrugation crests 128. In one embodiment, the radial distance from the top of an outer wall crest to the bottom of an adjacent outer wall valley (i.e., the "wave height") may be between 0.0 and 0.25 inches. In a further embodiment, the wave height may be between 0.15 and 0.25 inches.

Upon the manufacture of a plurality of corrugated pipe sections 117, such as the pipe section illustrated in FIG. 6, a system of corrugated pipes may be quickly and easily arranged and coupled lengthwise, from end to end. Specifically, spigot portion 114 of a first corrugated pipe section may be inserted into bell portion 112 of a second pipe section, as discussed with respect to FIG. 4A.

As will be appreciated by one of skill in the art, the presently disclosed couplings, pipe sections, and methods may enjoy numerous advantages over previously known pipe coupling systems. First of all, because spigot portions 14, 114 include three walls (i.e., inner wall 20, 120, corrugated wall 22, 122, and outer wall 24, 124), one of ordinary skill in the art would expect spigot portions 14, 114 to be substantially stronger than previously known spigots. Specifically, spigot portions 14, 114 may be made more rigid, without the use of extensive or excessive amounts of material. Similarly, because bell portions 12, 122 include two layers (i.e., outer wall 24, 124 and corrugated wall 22, 122), one of skill in the art would expect bell portions 12, 112 to be substantially stronger than previously known bells formed from a single layer of material. In particular, bell portions 12, 112 and spigot portions 14, 114 may be stronger than competing products that require the use of even more plastic for forming certain pipe wall layers.

Because there may be no significant change in the outer diameter of the pipe proximate to bell portions 12, 112, a substantially constant-dimension trench may be dug along the length of the pipe installation. Spigot portion 14 may be designed in the interests of creating a larger sealing surface on spigot outer wall 64 and a stronger triple-wall structure. Spigot portion 114 may be designed in the interests of creating a larger sealing surface on sealing portion 133 of bell portion 112 and a stronger triple-wall structure. In each embodiment, this may reduce the probability of misalignment between bell portions 12, 112, spigot portions 14, 114, and gaskets 34, 134, respectively, and may simplify the installation process.

Thus, an exemplary bell, spigot, and gasket disclosed herein may create an ASHTO-compliant, water-tight coupling, without the need for additional reinforcement means, such as straps, hinged clamps, or wraps. Nevertheless, in some embodiments, it may still be desirable to deform the outer wall of a bell portion 12, 112 after inserting a spigot portion 14, 114 into the bell portion 12, 112. Finally, an exemplary coupling may be substantially "in-line", thus creating a consistent and simple product, which may be easily transported to a jobsite and installed. This provides advantages in terms of reducing both material supplies and man-hours.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A pipe system comprising:
a first pipe including a first inner wall, a first outer wall, and a first corrugated wall, the first pipe having disposed at one end a bell portion, the bell portion including a portion of the first corrugated wall and a portion of the first outer wall;
a second pipe including a second inner wall, a second outer wall, and a second corrugated wall, the second pipe having disposed at one end a spigot portion, the spigot portion including a portion of the second corrugated wall positioned between a portion of the second inner wall and a portion of the second outer wall, wherein the spigot portion is inserted into the bell portion to couple the first pipe and the second pipe; and
a gasket disposed in a groove extending around a circumference of the spigot portion and contacting the portion of the first corrugated wall of the bell portion and the portion of the second outer wall of the spigot portion.

2. The pipe system of claim 1, wherein:
the second corrugated wall includes a plurality of primary corrugations, wherein the spigot portion includes a plurality of spigot corrugations having heights less than heights of the primary corrugations; and
the portion of the first corrugated wall of the bell portion is at least substantially fused to the portion of the first outer wall of the bell portion along its length.

3. The pipe system of claim 2, wherein the portion of the second outer wall of the spigot portion is drawn down onto the spigot corrugations, and the gasket includes a protrusion inserted into the groove and a sealing surface that engages the portion of the first corrugated wall of the bell portion when the spigot portion is inserted into the bell portion.

4. The pipe system of claim 3, wherein the portion of the first corrugated wall of the bell portion is smoothed against the portion of the first outer wall of the bell portion such that a water-tight interface is formed between the sealing surface of the gasket and the portion of the first corrugated wall of the bell portion when the spigot portion is inserted into the bell portion.

5. The pipe system of claim 2, wherein the portion of the second corrugated wall of the spigot portion further includes an intermediate corrugation disposed between the spigot corrugations and the primary corrugations, and a height of the intermediate corrugation is less than the heights of the spigot corrugations and less than the heights of the primary corrugations.

6. A multi-wall, corrugated pipe section including an inner wall, an outer wall, and a corrugated wall disposed between the inner and outer walls, the corrugated pipe section comprising:
   a spigot portion including a first portion of the corrugated wall disposed between a first portion of the inner wall and a first portion of the outer wall, wherein the first portion of the corrugated wall includes a first plurality of corrugation crests and a first plurality of corrugation valleys; and
   a bell portion including a second portion of the corrugated wall affixed to a second portion of the outer wall;
   wherein the spigot portion has a gasket retained in a groove extending around a circumference of the spigot portion, wherein the groove is positioned on a top end of a corrugation crest of the first plurality of corrugation crests.

7. The multi-wall, corrugated pipe section of claim 6, wherein the corrugated wall of the multi-wall, corrugated pipe section includes a plurality of primary corrugations having a primary height.

8. The multi-wall, corrugated pipe section of claim 7, wherein the first portion of the corrugated wall comprises:
   a plurality of spigot corrugations having heights less than the primary height of the primary corrugations; and
   a plurality of intermediate corrugations having heights less than the heights of the spigot corrugations.

9. The multi-wall, corrugated pipe section of claim 8, wherein the first portion of the corrugated wall includes two spigot corrugations, said two spigot corrugations extending axially together along a length of the pipe section between 4 and 8 inches, and two intermediate corrugations.

10. The multi-wall, corrugated pipe section of claim 9, wherein the first portion of the outer wall extends across and is fused to the two spigot corrugations, the two intermediate corrugations, and the primary corrugations.

11. The multi-wall, corrugated pipe section of claim 8, wherein a diameter of the spigot portion measured at the intermediate corrugations is less than a diameter of the spigot portion measured at a primary corrugation and less than a diameter measured at the spigot corrugations.

12. The multi-wall, corrugated pipe section of claim 7, wherein the second portion of the corrugated wall includes a plurality of bell corrugations having heights less than heights of the primary corrugations.

13. The multi-wall, corrugated pipe section of claim 6, wherein the outer wall of the pipe section includes a plurality of corrugations having crests and valleys, said outer wall crests being aligned with crests of the corrugated wall and said outer wall valleys being aligned with valleys of the corrugated wall.

14. The multi-wall, corrugated pipe section of claim 7, wherein the first portion of the inner wall extends to a spigot terminus proximate to the spigot corrugations, and the second portion of the inner wall extends to an inner wall terminus proximate to a primary corrugation closest to the bell portion.

15. A method of coupling multi-wall, corrugated pipe, the pipe including an inner wall, an outer wall, and a corrugated wall having a plurality of primary corrugations disposed between the inner and outer walls, the method comprising:
   positioning a first pipe section, having disposed at one end a spigot portion, the spigot portion including a first portion of the corrugated wall disposed between a first portion of the inner wall and a first portion of the outer wall of the multi-wall, corrugated pipe, wherein the first portion of the corrugated wall includes a groove extending around a circumference of the spigot portion, wherein the first portion of the outer wall extends over the first portion of the corrugated wall except over the groove;
   positioning a second pipe section, having disposed at one end a bell portion, the bell portion including a second portion of the corrugated wall affixed to a second portion of the outer wall of the multi-wall, corrugated pipe;
   inserting a gasket into the groove of the first portion of the corrugated wall; and
   inserting the spigot portion of the first pipe section into the bell portion of the second pipe section, such that the gasket engages second portion of the corrugated wall.

16. The method of claim 15, further comprising:
   removing a second portion of the inner wall from the second pipe section proximate to the bell portion, prior to inserting the spigot portion into the bell portion.

17. The method of claim 15, further comprising:
   removing a section of the first portion of the outer wall that extends over the groove of the first portion of the corrugated wall, prior to inserting the gasket into the groove of the first portion of the corrugated wall.

18. The method of claim 15, further comprising:
   deforming the second portion of the outer wall, after inserting the spigot portion into the bell portion.

19. The method of claim 15, further comprising:
   forming a water-tight interface between a sealing surface of the gasket and the second portion of the corrugated wall when the spigot portion is inserted into the bell portion.

* * * * *